US012646173B2

(12) United States Patent
Spiess et al.

(10) Patent No.: US 12,646,173 B2
(45) Date of Patent: Jun. 2, 2026

(54) METHODS FOR EVALUATING POLLEN GERMINATION, AND RELATED SYSTEMS

(71) Applicant: Monsanto Technology LLC, St. Louis, MO (US)

(72) Inventors: Gretchen Spiess, O'Fallon, MO (US); Weilin Wang, Ballwin, MO (US); Ross Zhan, Olivette, MO (US)

(73) Assignee: MONSANTO TECHNOLOGY LLC, Saint Louis, MO (US)

( * ) Notice: Subject to any disclaimer, the term of this patent is extended or adjusted under 35 U.S.C. 154(b) by 603 days.

(21) Appl. No.: 17/681,631

(22) Filed: Feb. 25, 2022

(65) Prior Publication Data

US 2022/0277453 A1 Sep. 1, 2022

Related U.S. Application Data

(60) Provisional application No. 63/154,611, filed on Feb. 26, 2021.

(51) Int. Cl.
*G06V 10/00* (2022.01)
*G01N 15/1433* (2024.01)
(Continued)

(52) U.S. Cl.
CPC ....... *G06T 7/0014* (2013.01); *G01N 15/1433* (2024.01); *G06V 10/751* (2022.01);
(Continued)

(58) Field of Classification Search
CPC ........ G06T 7/0014; G06T 2207/30188; G01N 15/1433; G01N 15/0227; G01N 15/147;
(Continued)

(56) References Cited

U.S. PATENT DOCUMENTS 5,066,594 A 11/1991 DeBonte et al.
2010/0062480 A1 3/2010 Graf et al.
(Continued)

FOREIGN PATENT DOCUMENTS

EP 0950890 B1 6/2005
JP 6745559 B1 8/2020
JP 2021021719 A 2/2021

OTHER PUBLICATIONS

Dunker, S., Motivans, E., Rakosy, D., Boho, D., Mader, P., Hornick, T. and Knight, T.M. (2021), Pollen analysis using multispectral imaging flow cytometry and deep learning. New Phytol, 229: 593-606 (Year: 2021).*

(Continued)

*Primary Examiner* — Vu Le
*Assistant Examiner* — Zaid Muhammad Saleh
(74) *Attorney, Agent, or Firm* — Harness, Dickey & Pierce, P.L.C.

(57) ABSTRACT

Methods and systems are provided for use in evaluating quality of pollen grains. One example method includes germinating pollen grains of a crop in a fluid media and inserting a sample of the germinated pollen grains and fluid media into a flow chamber of a fluid imaging system. The sample flows through the flow chamber at a predefined rate, and images of the sample are captured by a camera of the fluid imaging system. The method then includes comparing the captured images of the sample to reference images specific to the crop and, based on the comparison, generating a pollen germination score for the sample, the pollen germination score indicative of germinated pollen grains in the sample.

20 Claims, 4 Drawing Sheets

(51) Int. Cl.

| | | |
|---|---|---|
| *G06T 7/00* | (2017.01) |
| *G06V 10/75* | (2022.01) |
| *G06V 10/764* | (2022.01) |
| *G01N 15/14* | (2006.01) |

(52) U.S. Cl.
CPC ... *G06V 10/764* (2022.01); *G01N 2015/1493* (2013.01); *G06T 2207/30188* (2013.01)

(58) Field of Classification Search
CPC ....... G01N 2015/1497; G01N 15/1459; G06V 10/751; G06V 10/82
See application file for complete search history.

(56) References Cited

U.S. PATENT DOCUMENTS

| | | |
|---|---|---|
| 2012/0035061 A1 | 2/2012 | Bransky et al. |
| 2013/0107261 A1 | 5/2013 | Duplisea et al. |
| 2014/0115730 A1* | 4/2014 | Cope ............... G01N 33/56961 |
| | | 435/7.1 |
| 2015/0253273 A1* | 9/2015 | Heidmann ........ B01L 3/502761 |
| | | 702/19 |
| 2019/0008144 A1 | 1/2019 | Etter et al. |
| 2019/0368998 A1 | 12/2019 | Sieracki et al. |
| 2020/0338599 A1 | 10/2020 | Shniberg et al. |
| 2020/0367422 A1 | 11/2020 | Shniberg et al. |

OTHER PUBLICATIONS

Relationship between desiccation and viability of maize pollen (Year: 2004).*

Dunker, S., Motivans, E., Rakosy, D., Boho, D., MÃ¤der, P., Hornick, T. and Knight, T.M. (2021), Pollen analysis using multispectral imaging flow cytometry and deep learning. (Year: 2021).*

Dunker, S., Motivans, E., Rakosy, D., Boho, D., MÃ¤der, P., Hornick, T. and Knight, T.M. (2021), Pollen analysis using multispectral imaging flow cytometry and deep learning. New Phytol, 229: 593-606 (Year: 2021).*

Quantitative methods in microscopy to assess pollen viability in different plant taxa (Year: 2020).*

Impedance Flow Cytometry: A Novel Technique in Pollen Analysis (Year: 2016).*

Fonseca et al, "Relationship Between Desiccation and Viability of Maize Pollen", Field Crops Research, Elsevier, Amsterdam, NL, vol. 94, No. 2-3, Nov. 15, 2005, pp. 114-125.

* cited by examiner

METHODS FOR EVALUATING POLLEN GERMINATION, AND RELATED SYSTEMS

CROSS-REFERENCE TO RELATED APPLICATION

This application claims the benefit of, and priority to, U.S. Provisional Application No. 63/154,611, filed on Feb. 26, 2021. The entire disclosure of the above application is incorporated herein by reference.

FIELD

The present disclosure generally relates to methods and systems for use in evaluating pollen quality (e.g., germination viability, etc.) of pollen grains, and more particularly, to processes related to fluid imaging, for example, through use of flow image analysis systems, of the pollen grains for effecting such evaluation.

BACKGROUND

This section provides background information related to the present disclosure which is not necessarily prior art.

The process of fluid imaging can be used to image and analyze particles in fluid. Typically, the process is used to image particles in water to detect effectiveness of a fluid treatment on the water. In doing so, a liquid water sample is introduced into a flow chamber of a fluid imaging device, where images of particles in the sample are captured as the sample flows through the device. The images are then used to determine the quantity and type of particles contained in the water to understand the effectiveness of the fluid treatment.

SUMMARY

This section provides a general summary of the disclosure, and is not a comprehensive disclosure of its full scope or all of its features.

Example embodiments of the present disclosure generally relate to methods for use in evaluating pollen quality (e.g., germination viability, etc.) of pollen grains. In one example embodiment, such a method generally includes germinating pollen grains of a crop in a fluid media; inserting a sample of the germinated pollen grains and fluid media into a flow chamber of a fluid imaging system; generating, by the fluid imaging system, a flow of the sample through the flow chamber at a predefined rate; capturing, by an image capture device (e.g., a camera, etc.) of the fluid imaging system, images of the sample as the sample flows through the flow chamber; identifying, by a processor of the fluid imaging system, the captured images of the sample into categories, wherein the categories include a germinated pollen grain category and at least one of: a non-germinated pollen grain category, a lysed pollen grain category, and/or a debris particle category; and based on the identification of the images into the categories, generating, by the processor of the fluid imaging system, a pollen germination score for the sample, where the pollen germination score is indicative of germinated pollen grains in the sample (e.g., a percentage of germinated pollen grains, etc.).

Example embodiments of the present disclosure also generally relate to systems configured to evaluate pollen quality (e.g., germination viability, etc.) of pollen grains and generate germination scores indicative of germinated pollen grains in samples of such pollen grains (e.g., percentages of germinated pollen grains in the samples, etc.). In one example embodiment, such a system generally includes an analysis unit configured to: receive a sample of the germinated pollen grains and fluid media; apply a size threshold to the particles in the sample; and capture images of the particles included in the sample that satisfy the size threshold. The system also generally includes a computing device in communication with the analysis unit, the computing device configured to: categorize the captured images of the sample into one of a germinated category and a non-germinated and/or lysed category based on at least one rule; and generate a pollen germination score for the sample based on the categorization of the captured images, the pollen germination score indicative of germinated pollen grains in the sample.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

In pollination, pollen grains are transferred from male anthers of plants (e.g., of flowers of the plants, etc.) to female stigmas (e.g., of flowers of the plants or other plants, etc.). The plants may be capable of self-pollination, cross-pollination, or both. Self-pollination involves the transfer of pollen from male anthers of plants (e.g., of flowers of the plants, etc.) to female stigmas of the same plants (e.g., of flowers of the same plants, etc.). And, cross-pollination involves the transfer of pollen from male anthers of plants (e.g., of flowers of the plants, etc.) to female stigmas of different plants (e.g., of flowers of different plants, etc.) (e.g., plants from a different family, line, etc.). In this way, the plants are able to create offspring in the form of seeds, which contain genetic information to produce new plants. However, the seeds can only be produced when the transferred pollen grains are of suitable quality (e.g., are viable, etc.). Uniquely, the present disclosure utilizes fluid imaging analysis to determine germination state, status, suitability, etc. of the pollen grains, in advance of being transferred. In particular herein, the desired pollen grains are collected and incubated in a fluid germination media, based on the particular plant(s) with which the pollen grains are associated. Thereafter, the fluid germination media and pollen grains are transferred to a fluid imaging system for analysis, whereby pollen germination scores for the pollen grains may be produced.

Example embodiments will now be described more fully with reference to the accompanying drawings. The description and specific examples included herein are intended for purposes of illustration only and are not intended to limit the scope of the present disclosure.

Figure 1:
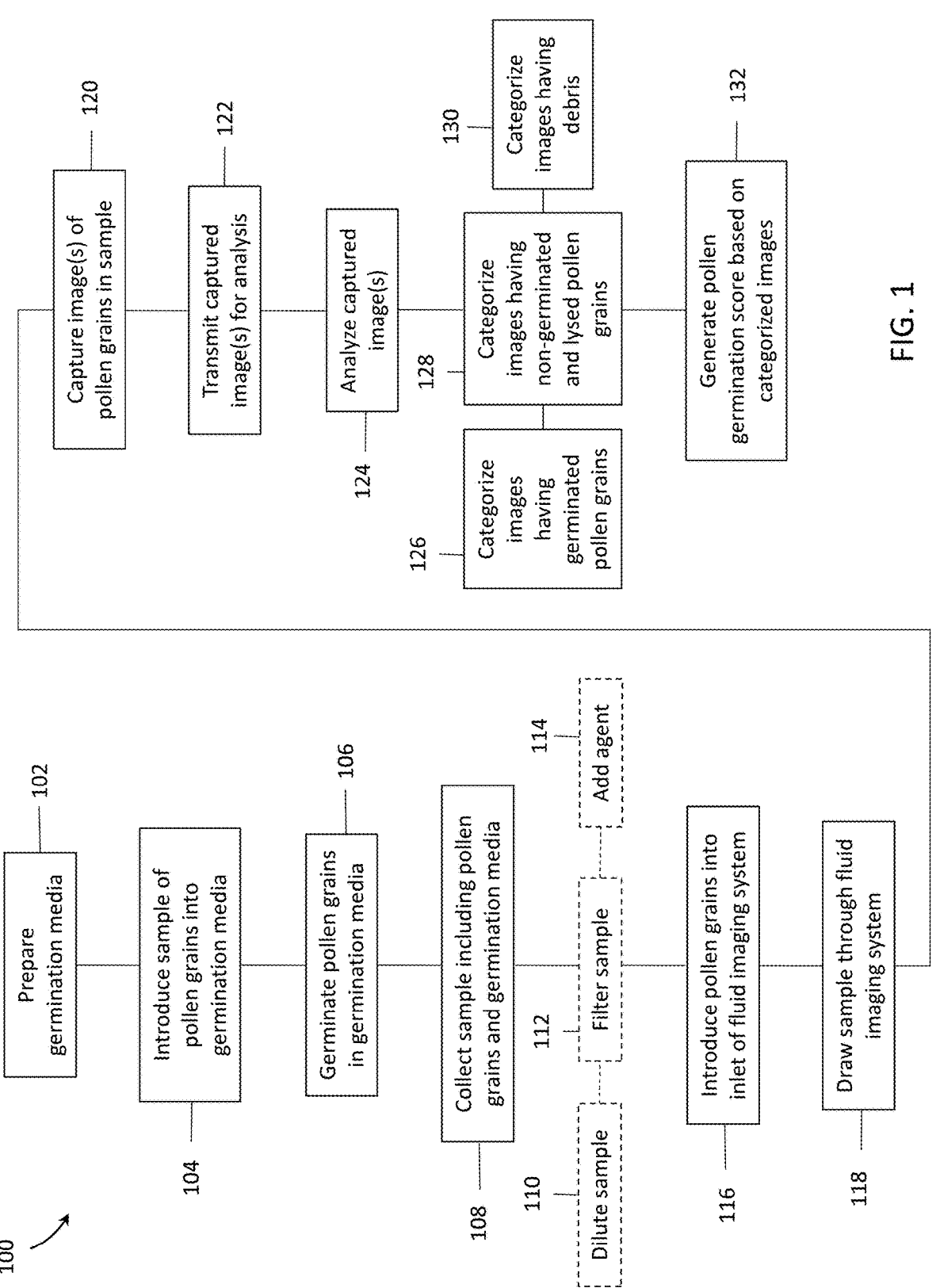
FIG. 1 illustrates an example method of the present disclosure for use in evaluating pollen quality of pollen grains.
Figure 2:
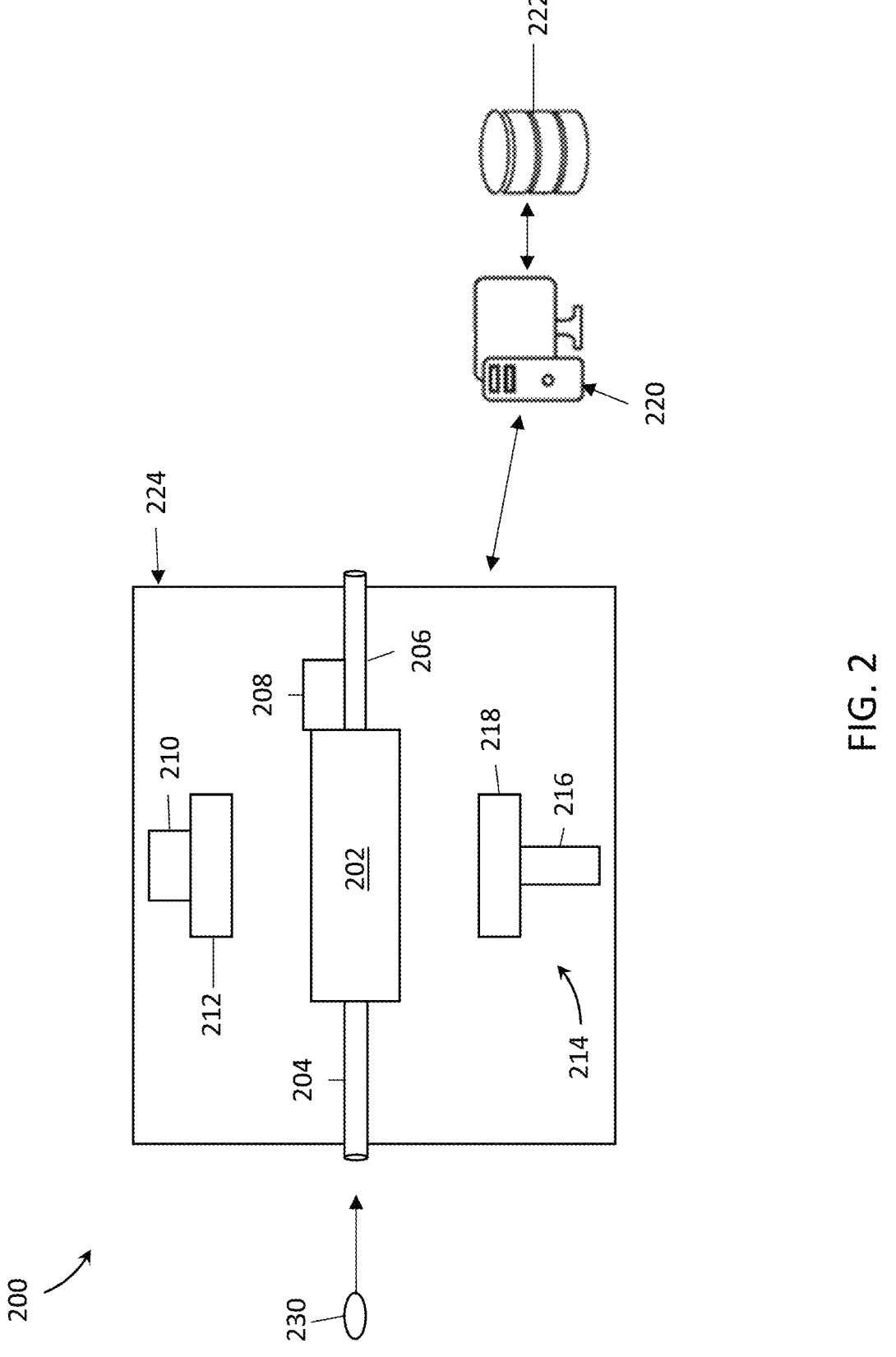
FIG. 2 illustrates an example system that may be implemented in connection with the method of FIG. 1 to evaluate pollen quality of the pollen grains.

FIG. 1 illustrates an example method 100 of the present disclosure for use in evaluating quality of pollen grains of one or more particular crop (e.g., pollen grain viability thereof, etc.), based on computer-implemented analysis of the pollen grains. The evaluation is aided, in part, by a fluid imaging system 200 (e.g., an automated flow imaging particle analysis system, etc.) as illustrated in FIG. 2 and described in more detail below. It should be appreciated that the fluid imaging system 200 is example in nature, and that the method 100 may be implemented in other analysis systems within the scope of the present disclosure (e.g., the method 100 is not limited to the illustrated fluid imaging system 200, etc.). It should also be appreciated that the method 100 and system 200 herein may be used with pollen grains from any desired crop including, without limitation, corn, rice, soybeans, cotton, wheat, etc.

With reference to FIG. 1, at 102 in the method 100, a germination media (e.g., a fluid media such as a liquid, a gel, etc.) is prepared or developed, based on pollen grains to be evaluated, and in particular, a crop with which the particular pollen grains are associated. The germination media is therefore specific to the pollen grains, and the crop, being evaluated. In this way, different germination media may be prepared for different crops (e.g., for rice crops, corn crops, soybean crops, other crops, etc.). It should be appreciated that, in preparing the germination media, the germination media may be biologically optimized for its corresponding crop, for example, to maintain proper osmotic pressure of the pollen grains of the crop when suspended and/or submerged in the germination media (e.g., to inhibit lysis, etc.), to provide necessary signals to promote germination of the pollen grains, etc. For example, maintaining proper osmotic pressure may enable the pollen grains to absorb water/moisture without bursting. In connection therewith, a sugar such as sucrose and/or polyethylene glycol (PEG), of various molecular weights, may be included in the germination media to help facilitate a proper and/or desired osmotic pressure. Additionally, chemicals such as boron and calcium may be included in the germination media to promote and/or facilitate (e.g., provide necessary signals for, etc.) pollen germination and tube growth. Further, pH may be monitored and adjusted, buffered, etc. to desired values, for example, between about 5.5 and about 6.5, between about 5.6 and about 6.0, to about 5.7, to about 5.8, to about 5.9, etc. In this way, as indicated above, the germination media may be biologically optimized.

Table 1 incudes example germination media that may be used for each of rice, corn, and soybean crops. It should be appreciated, though, that other germination media may be used for rice, corn, and/or soybean crops within the scope of the present disclosure. In addition, it should be appreciated that the same or other germination media may be used for other crops to be analyzed as described herein.

TABLE 1

| Crop | Component/Reagent | Quantity | Concentration |
|---|---|---|---|
| Rice | Sucrose | 10 g | N/A |
| | PEG 4000 | 10 g | N/A |
| | Boric Acid | 647 μL | 100 mM |
| | Calcium Nitrate Tetrahydrate | 254 μL | 100 mM |
| | Thiamine-HCL | 89 μL | 10 mM |
| | Peptone | 10 mg | N/A |
| | Water | 100 mL | N/A |
| Corn | Sucrose | 10 g | N/A |
| | PEG 4000 | 6 g | N/A |
| | Calcium Chloride | 1 mL | 1M |
| | Boric Acid | 808 μL | 100 mM |
| | Potassium Phosphate Monobasic | 5 μL | 1M |
| | Water | 100 mL | N/A |
| Soybeans | Sucrose | 100 g | N/A |
| | Boric Acid | 30 mg | N/A |
| | Water | 1000 mL | N/A |

In connection with the above, in preparing or developing the germination media, the components are combined as appropriate and in a suitable container. For instance, for the germination media for rice, the components (e.g., the sucrose, polyethylene glycol (with a molecular weight of 4000) (PEG 4000), boric acid (e.g., from a stock solution of 100 mM boric acid, etc.), calcium nitrate tetrahydrate, thiamine-HCL, and peptone, etc.) may be initially combined (e.g., mixed together, etc.) in a beaker with MilliQ water until all of the components are dissolved. The volume of the mixture/solution in the beaker can then be brought to 100 mL, using MilliQ water, and the pH adjusted to between about 5.5 and about 6.5 (e.g., to between about 5.6 and about 6.0, to about 5.8, etc.). In connection with adjusting the pH, hydrochloric acid (HCl) may be used to lower the pH as needed (e.g., to about 5.8, etc.) and sodium hydroxide (NaOH) may be used to elevate the pH as needed (e.g., to about 5.8, etc.). Similarly, for the germination media for corn, the components (e.g., the sucrose, PEG 4000, calcium chloride (e.g., from a stock solution of 1 M anhydrous calcium chloride, etc.), boric acid, and potassium phosphate monobasic (e.g., from a stock solution of 1 M potassium phosphate monobasic, etc.), etc.) may be initially combined (e.g., mixed together, etc.) in a beaker with MilliQ water until all of the components are dissolved. And, in turn, the volume of the mixture/solution in the beaker can be brought to 100 mL, using MilliQ water, and the pH then adjusted (as described above) to between about 5.5 and about 6.5 (e.g., to about 5.8, etc.). The germination media for soybeans may be similarly prepared. In some examples, where multiple samples are to be run back-to-back, a higher amount of sucrose may be used to the germination media (e.g., higher than shown in Table 1, etc.), for example, to inhibit germ tubes from bursting, etc.

Next in the method 100, after the germination media is prepared, the pollen grains to be evaluated are obtained and introduced into the media, at 104. The pollen grains to be evaluated herein may be obtained from a breeding program, as a representative sample of pollen grains from a given crop in the breeding program, or otherwise (e.g., in insulated collection cups, etc.). And, the obtained pollen grains are then placed on/in a sterile incubation container (e.g., on a slide, in a Petri dish, in a well of a plate having multiple wells (e.g., a 12-well cell culture plate, etc.), etc.) along with the germination media, such that the pollen grains are suspended and/or submerged in the germination media. In doing so, a suitable amount of germination media is included in the incubation container, for example, about 50 mL or less, about 40 mL or less, about 30 mL or less, about 20 mL or less, about 10 mL or less, about 5 mL or less, about 2 mL or less, etc. Similarly, a suitable amount (or sample size) of pollen grains is introduced into the germination media, for example, about 50 mg or less, about 40 mg or less, about 35 mg or less, about 30 mg or less, about 20 mg or less, about 10 mg or less, about 5 mg or less, etc. In one example, wells of a cell culture plate are each filled with about 2 mL of the germination media, and about 2 mg of the pollen grains are then introduced into the wells (e.g., without filtering first, with filtering first to remove anthers and other debris (as described more below), etc.). In some examples, the collected pollen may be incubated prior to being placed in the germination media.

After combining the pollen grains with the germination media, the pollen grains are germinated, at 106, in the germination media. In doing so, the pollen grains and germination media are incubated in the sterile incubation container for a predetermined amount of time (e.g., based on the crop, the composition of the germination media, etc.) to allow the pollen grains to germinate. The incubation time may range from about 2 minutes to about 100 minutes, and may vary for different crops. For instance, for rice, the incubation time may be between about 5 minutes and about 10 minutes. And, for corn, the incubation time may be between about 45 minutes and about 60 minutes. In addition, the incubation container is maintained under generally room-temperature conditions during the incubation time (e.g., between about 68 degrees Fahrenheit and about 72 degrees Fahrenheit, etc.).

Subsequently in the method 100, a sample (e.g., a liquid sample, a fluid sample, etc.) of the pollen grains and germination media mixture is collected, at 108, from the incubation container for evaluation. This may include, for example, drawing the sample out of the incubation container and into a pipette or other suitable collection or sample device, or otherwise capturing the sample form the incubation container. The sample drawn from the incubation container is sized to ensure that a desired number of pollen grains are captured, extracted, etc. from the incubation container (e.g., at least about 300 pollen grains, at least about 500 pollen grains, at least about 1000 pollen grains, etc.). In doing so, the sample size may range from about 1 mL to about 2 L (e.g., about 2 mL, about 3 mL, about 5 mL, about 50 mL, about 500 mL, etc.), depending on the pollen grains being evaluated, the crop with which the pollen grains are associated, and/or the germination media used to germinate the pollen grains, etc.

As part of collecting the sample (either before, during, or after), the pollen grains and germination media included in the sample may optionally be diluted, at 110, to help facilitate movement of the sample through an analyzer 224 (broadly, analysis unit or analysis system, etc.) of the fluid imaging system 200, to increase a size of the sample introduced to the analyzer 224, to limit a number of pollen grains introduced to the analyzer 224 (e.g., such that all or substantially all pollen grains passing through the analyzer 224 can be imaged, etc.), etc. For example, additional germination media may be added to the incubation container prior to drawing the sample out of the container (e.g., whereby the additional germination media is used to achieve the dilution in order to inhibit disrupting the osmotic potential of the pollen grains and causing the grains to lyse, etc.), and the diluted mixture in the container may then be collected. Alternatively, additional germination media may be added to the sample, after the sample is collected from the incubation container. In either case, the amount of dilution may include any desired amount, for example, about a 1:1 dilution, a greater dilution ratio, a smaller dilution ratio, etc. It should be appreciated that other dilution substances may be used in other embodiments, for example, MilliQ water, etc.

That said, it should also be appreciated that the sample drawn from the incubation container, even when diluted as described above, is still sized to ensure that a desired number of pollen grains are captured, extracted, etc. from the incubation container (e.g., at least about 300 pollen grains, at least about 500 pollen grains, at least about 1000 pollen grains, etc.). Additionally, implementation of this feature may depend on the type of pollen grains in the sample, the crop with which the pollen grains are associated, the germination media used to germinate the pollen grains, etc. (e.g., dilution may be utilized for crops having smaller pollen grains in order to increase a size of the sample (e.g., soy, etc.), for germination media having a gel-like consistency (e.g., to ensure the sample does not clog the analyzer 224, etc.) etc.).

Also as part of collecting the sample (either before, during, or after), the mixture of the pollen grains and germination media in the incubation container and/or in the collected sample may optionally be filtered, at 112. For example, the pollen grains may be filtered prior to being introduced into the germination media. Or, the mixture of the pollen grains and germination media in the incubation container may be filtered prior to collection of the sample therefrom. Or, further, the sample collected from the incubation container may be filtered prior to being introduced to the analyzer 224. In any case, such filtering may remove larger materials from the mixture and/or sample that may have been included with the pollen grains when originally collected (e.g., anthers, leaves, etc.). As an example, the pollen grains may be passed through a filter prior to being introduced into the germination media. In doing so, the filter may have a size of between about 50 μm and about 150 μm. As another example, the pollen grains and germination media may be filtered by passing the entire mixture from the incubation container through a filter having a filter size of between about 50 μm and about 150 μm. In one particular example, for rice pollen grains, the pollen grains and germination media may be passed through a 100 μm filter. In another particular example, for corn pollen grains, the pollen grains and germination media may be passed through an 80 μm filter. As a further example, the collected sample itself may be passed through such a filter (e.g., a filter having a filter size of between about 50 μm and about 150 μm, etc.). That said, in any of the above examples, any suitable filter may be used to filter the pollen grains, the mixture and/or the sample including, for example, a mesh filter, a microfiber filter, etc. Additionally, implementation of this feature may depend on the type of pollen grains in the sample, and the crop with which they are associated (e.g., filtration may be utilized for crops in which the pollen grains are still associated with anthers (e.g., corn, rice, etc.), etc.).

Further in the method 100, in some implementations the sample may be collected from the incubation container generally immediately following incubation of the pollen grains in the germination media (after the predetermined incubation time for the pollen grains) and then evaluated (as described below).

Optionally, though, at 114 in the method 100, one or more agent (e.g., stop agent(s), color agents, etc.) may be added to the germination media following incubation of the pollen grains (e.g., generally immediately after the predetermined incubation time for the pollen grains, etc.) and/or as part of sample collection.

In some examples, the agent(s) operate to stop or pause germination of the pollen grains and/or to preserve a germination state of the pollen grains (e.g., to inhibit excess growth after a given incubation time in order to standardize analysis of pollen grains to (or based on) the common incubation time, etc.). For example, the stop agent(s) may inhibit water from entering the pollen tubes of the grains, etc., whereby growth of the pollen tubes (pollen grains in general) is paused or stopped. The pollen grains are then maintained in the mixture (with the stop agent(s)) at room temperature for a desired time (e.g., until analysis is desired, etc.). In doing so, collection and/or evaluation of the of the pollen grains may be delayed for a desired period of time, for example, up to about four hours or less, about twenty-four hours or less, etc. In other words, a time frame in which the pollen grains can be evaluated, via the fluid imaging system 200 (and analyzer 224), can be extended through use of such agent(s). Example agents include, without limitation, sucrose (e.g., 30% sucrose, etc.), ethanol, BAPTA, lanthanum chloride, other calcium channel blockers, etc. And, an amount of the agent(s) added to the mixture, in order to stop or pause germination, may include about a 1:1 by volume amount. In one example, ethanol (broadly, an agent) may be added to a mixture of soy pollen grains and the corresponding germination media (e.g., where the pollen grains are associated with soy, etc.), in the incubation container or otherwise, to pause germination of the soy pollen grains and allow for delay in evaluation thereof for at least about 4 hours. In another example, about 2 mL of 30% sucrose may be added to 2 mL of germination media to pause germination of the corn pollen grains and allow for delay in evaluation thereof for at least about 4 hours.

In some examples, the agent(s) operate to provide contrast to the pollen grains in the samples during analysis of the samples (e.g., during image collection, etc.). Examples of such agents may include, for instance, dyes, stains, etc.

Once the sample is collected (and, as desired or appropriate, after it is diluted, filtered, and/or a stop agent is added, etc.), the sample is evaluated using the fluid imaging system 200 (via the analyzer 224). With additional reference to FIG. 2, the illustrated fluid imaging system 200 includes the analyzer 224, which comprises a flow chamber 202 (e.g., a flow cell, etc.) having an inlet 204 for receiving a sample 230 (as obtained at 108 in the method 100 and as optionally processed at 110-114) to be evaluated and an outlet 206 through which the sample 230 passes out of the flow chamber 202 after being evaluated (e.g., after imaging functions have been performed, etc.). A pump 208 (e.g., a micro-syringe pump, a peristaltic pump, etc.) is coupled to the flow chamber 202 and/or the outlet 206. The pump 208 is configured to enable, to facilitate, to control, etc. flow of the sample 230 through the flow chamber 202, for example, at a predetermined and selectable rate, and to transfer the sample 230 out of and away from the flow chamber 202, via the outlet 206, for subsequent processing (e.g., disposal, recycling, etc.).

In particular in the method 100, in order to evaluate the collected sample of the pollen grains (and germination media), the sample 230 is inserted or injected (broadly, introduced), at 116, into the inlet 204 of the flow chamber 202 of the analyzer 224 (e.g., using a pipette, etc.). In one example, the sample 230 may be directly introduced (e.g., manually inserted, injected, etc.) into the inlet 204. Alternatively, in another example, the sample 230 may be part of multiple samples (e.g., an array or sequence of samples from the same pollen grain source, from different pollen grain sources, relating to the same pollen grains, relating to different pollen grains, having the same preparation characteristics, having different preparation characteristics, having different dilutions, having different additives, etc.) that are then introduced (e.g., inserted, injected, etc.) by way of an auto-sampler. For instance, in such later embodiment, the sample 230 may be part of an array or sequence of samples created automatically (e.g., by way of a robotic device, etc.) and included in a multi-well plate (e.g., a 96 well plate, etc.). An automatic (or automated) sample handling/delivery device may then be used to retrieve the samples from the plate and automatically introduce the retrieved samples into the inlet 204 of the flow chamber 202 of the analyzer 224.

In any case, once introduced, the sample 230 is then drawn, at 118, from the inlet 204 into the flow chamber 202 via the pump 208. In doing so, the pump 208 generates a flow of the sample 230 through the flow chamber 202 at a predefined flow rate based on one or more settings and/or configurations of the analyzer 224 and/or fluid imaging system 200 (in general) (for example, settings of the pump 208, etc.). In general, the predefined flow rate will be specific to the pollen grains being evaluated, and may range between about 0.05 mL/minute and about 100 mL/minute, between about 0.005 mL/min and about 50 mL/min, between about 0.005 mL/min and about 10 mL/min, between about 0.005 mL/min and about 5 mL/min, about 3 mL/min, between about 0.005 mL/min and about 2 mL/min, about 2 mL/min, about 1.5 mL/min, about, about 0.5 mL/min, etc. Additionally, the predefined flow rate may be dependent on the crop with which the pollen grains are associated and/or the germination media used for the given pollen grains (e.g., a viscosity of the germination media, etc.). As an example, taking into account the germination media in Table 1, the predefined flow rate for a sample of pollen grains associated with corn may be about 0.5 mL/minute. And, the predefined flow rate for a sample of pollen grains associated with soy may be about 0.1 mL/minute. Further, the predefined flow rate may take into account an image capture rate of the sample as the sample flows through the flow chamber 202. For instance, for a given image capture rate, images may overlap at lower flow rates while gaps may exist at higher flow rates. Additionally, at lower flow rates, the pollen grains may change positions as they flow through the flow chamber 202. On these points, then, in one example embodiment, a flow rate of about 0.5 mL/min may be used together with an image capture rate of about 8 frames per second to inhibit the pollen grains from changing positions as they flow through the flow chamber 202 (or at least reduce an amount of such change) and also to capture a generally continuous set of images of the flow (e.g., without overlaps or substantial overlaps, without gaps or substantial gaps, etc.).

In connection with the above, the flow chamber 202 of the analyzer 224 of the fluid imaging system 200 may be constructed from suitable materials to allow particle detection and imaging (broadly, evaluation). For instance, the flow chamber 202 may be constructed from one or more materials that do not readily fluoresce, including, for example, but not limited to, microscope glass or rectangular glass extrusions, etc. In addition, the flow chamber 202 may be circular or rectangular in cross-section shape, and may be further constructed with a wall thickness suitable for use with optics and imaging components of the analyzer 224 suitable for imaging the sample 230. The particular materials used to construct the flow chamber 202 and/or the particular wall thickness of the flow chamber 202 may be dependent on the crop from which the pollen grains being evaluated were obtained. For instance, for pollen grains associated with corn, the flow chamber 202 may have a generally rectangular shape, be constructed from microscope glass with a wall thickness that substantially matches that of a microscope cover slide (e.g., between about 100 μm and about 1000 μm, etc.), and have a field of view depth of about 300 μm (to accommodate the larger size of the pollen grains) and a width of about 3,000 μm. While for soy, the flow chamber 202 may be of a similar construction, and have a smaller field of view depth, of about 80 μm (to accommodate the smaller size of the pollen grains).

Then in the method 100, once the sample is in the flow chamber 202, images of the pollen grains are captured by the analyzer 224 of the fluid imaging system 200, at 120.

With reference again to FIG. 2, to facilitate this imaging, the analyzer 224 includes a light source 210 (e.g., a light emitting diode (LED), another form of light, etc.) configured to generate light to backlight the flow chamber 202. For example, the light source 210 may be configured to produce a flash of light at a sufficiently high intensity to backlight the flow chamber 202 to allow for imaging of the passing sample and particles therein (e.g., a white LED flash or a flash of another suitable wavelength, which is flashed on one side of the flow chamber 202 for a specified time (e.g., about 200 μsec or less, etc.), etc.). Additionally in the system 200, the light source 210 is coupled to a lens 212 (e.g., a condenser lens, etc.) configured to focus the light from the light source 210 on the flow chamber 202. In this way, the lens 212 aids in illuminating the particular portion of the flow chamber 202 to be imaged by camera 216 (broadly, an imaging device or image capture device), as discussed hereinafter. In one example embodiment, the light source 210 may include a LED light source, and the lens 212 may include a lens having a numerical aperture (NA) of at least about 0.5 or greater. It should be appreciated that the particular light source 210 and/or lens 212 used may be dependent on the crop from which the pollen grains being evaluated were obtained.

The analyzer 224 of the fluid imaging system 200 also includes a detection system 214 disposed on a generally opposite side of the flow chamber 202 from the light source 210. The detection system 214 is configured to detect particles existing in the flow chamber 202 when the light source 210 is activated. In the illustrated embodiment, the detection system 214 generally includes a camera 216 and an objective lens 218 associated with the camera 216. The camera 216 is configured to capture images of the sample 230 as it moves through the flow chamber 202 (e.g., at desired times based on the flow rate of the sample 230 through the flow chamber 202, etc.). And, the objective lens 218 is configured to focus and magnify the illuminated image from the flow chamber 202, for the camera 216 (e.g., by focusing/magnifying the light from the light source 210 onto the camera 216, etc.). In addition, the detection system 214 may utilize user-adjusted gain and/or threshold settings to determine an amount of scatter required for a passing particle to be identified (e.g., such that the camera 216 is able to actually capture an image of the particle, etc.). That said, the camera 216 may include a digital camera, an analog camera with a frame-grabber, or another device for capturing the images (e.g., a CCD camera, etc.). And, the objective lens 218 may include a lens with a magnification of between about 4× and about 200×. For example, for corn pollen, the objective lens 218 may include a 4× lens. And, for rice pollen, the objective lens 218 may include a 10× lens. As above, it should be appreciated that the particular camera 216 and/or objective lens 218 used may be dependent on the crop from which the pollen grains being evaluated were obtained. For instance, for crops with smaller pollen grains (e.g., soy, etc.), objective lenses having higher magnifications may be used (e.g., magnifications of about 10× or more, etc.). While for crops with larger pollen grains (e.g., corn, etc.), objective lenses having lower magnifications may be used (e.g., magnifications of about 4×, etc.).

Figure 3:
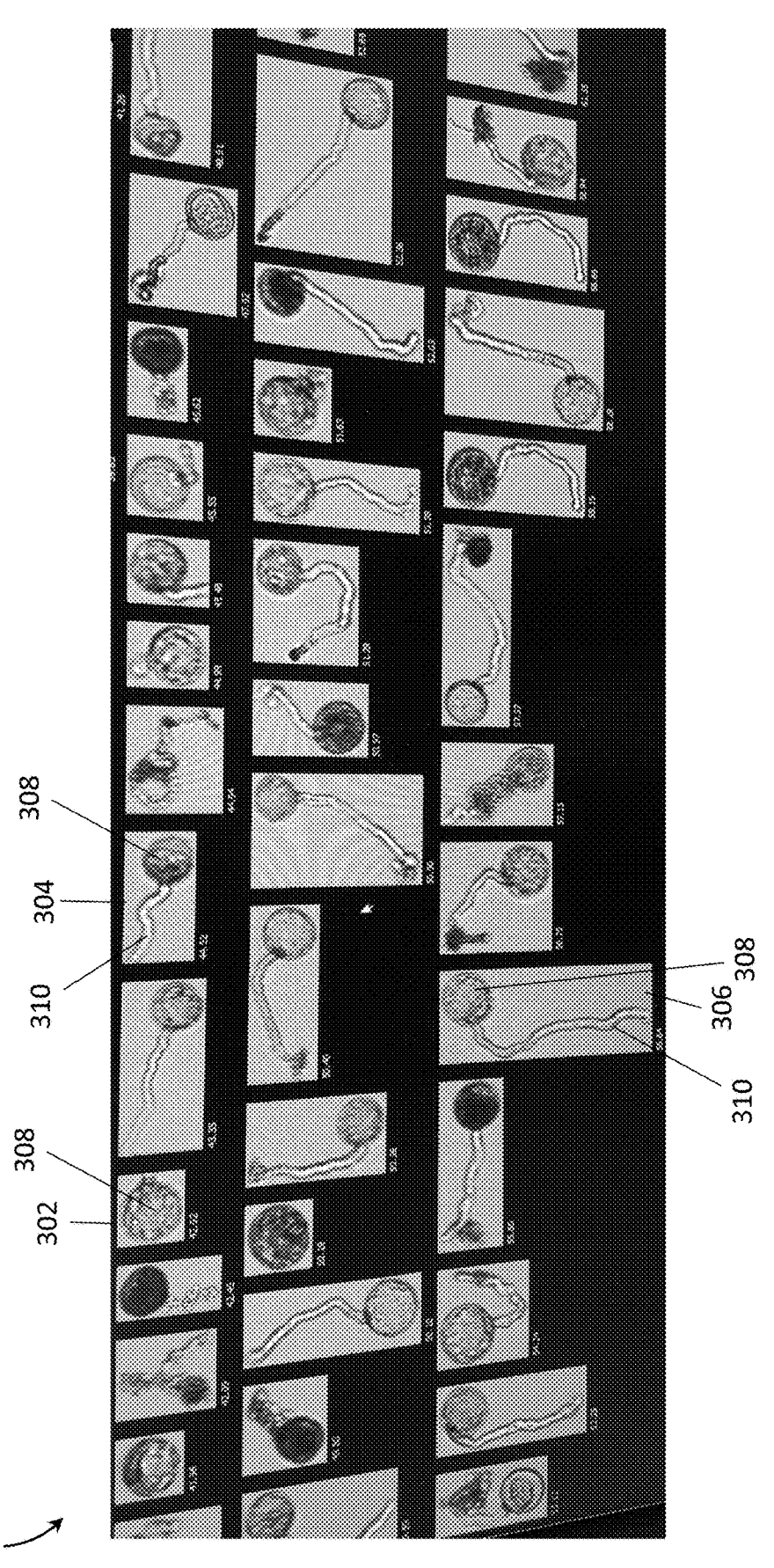
FIG. 3 illustrates example images of pollen grains that may be captured in connection with the method of FIG. 1 and/or the system of FIG. 2.

When a sufficiently lighted particle passes through the flow chamber 202 of the analyzer 224 (e.g., a pollen particle (a germinated pollen grain, a non-germinated pollen grain, a lysed pollen grain, etc.), a non-pollen particle (debris, etc.), etc.), an image is captured of the particle by the camera 216. Each captured image depicts one or more particle(s) included in the sample and/or processed by the detection system 214. Images that include only one particle are then further processed/analyzed. Any image that includes more than one particular may be counted as a clump and excluded from analysis. FIG. 3 illustrates an example set 300 of images that may be captured by the detection system 214 for a sample including pollen grains associated with rice.

In some embodiments, the detection system 214 may also be coupled to (or in communication with) the light source 210, directly or indirectly via computing device 220 of the system 200, etc. In such embodiments, the detection system 214 and/or the computing device 220 may automatically generate a trigger signal at a selectable time interval (e.g., based on a setting selectable by a user of the analyzer 224 of the fluid imaging system 200, etc.). In doing so, the trigger signal may produce a signal to activate the light source 210 to illuminate the flow chamber 202. And, at the same time, the camera 216 is then activated to capture an instantaneous image of the particle(s) in the flow chamber 202 (e.g., as generally frozen in time when the light source 210 is activated, etc.).

In the illustrated embodiment, the detection system 214 of the analyzer 224 may be configured to capture at least about 500 images of the sample 230 (e.g., about 600 or more images, about 700 or more images, about 800 or more images, about 1000 or more images, etc.), as the sample flows through the flow chamber 202 (e.g., in TIFF format, AVI video format, other image formats, etc.). In addition, in some embodiments, the detection system 214 may be configured to capture video of the sample 230 as the sample flows through the flow chamber 202 (at a desired capture rate (e.g., at a capture rate of between about 1 frame per second to about 60 frames per second, about 4 frames per second, about 8 frames per second, etc.). In connection therewith, frames of the video may be analyzed in a similar manner to the captured images described herein (whereby the frames may broadly be considered images herein). In some example embodiments, the detection system 214 may be configured to capture images of the sample 230 until a desired threshold number of images is achieved or when a desired threshold number of particles is imaged (e.g., about 1500 particles or more or less, etc.)

Next in the method 100, after the images of the sample 230 are captured by the camera 216 of the analyzer 224, the images are transmitted by the detection system 214, at 122, to the computing device 220 for analysis. The images may be transferred individually, after each image is captured, or in bulk after multiple images are captured. In either case, the computing device 220 is configured to receive the images and to store them in memory associated therewith (e.g., in data structure 222 associated therewith, etc.). In connection therewith, in order to receive the images, the computing device 220 is in communication with the various components of the fluid imaging system 200 (e.g., the camera 202, the pump 208, the detection system 214, etc.) via one or more network(s), as indicated by the arrowed line in FIG. 2. The one or more network(s) may include, without limitation, a wired and/or wireless network, a local area network (LAN), a wide area network (WAN) (e.g., the Internet, etc.), a mobile network, and/or another suitable public and/or private network capable of supporting communication among the various components of the fluid imaging system 200 and the computing device 220.

In turn in the method 100, upon receipt of the images, the computing device 220 is configured to analyze the images, at 124. In connection therewith, in this example embodiment, the computing device 220 includes (e.g., stored in data structure 222 associated therewith, or otherwise accessible thereto, etc.), among other things, one or more libraries of reference images of pollen grains (e.g., germinated pollen grains, non-germinated pollen grains, lysed pollen grains, etc.), where each library includes reference images specific to a particular crop to be analyzed (e.g., corn, rice, soy, etc.). The reference images are categorized within each library based on the type of particle included in each reference image (e.g., germinated, non-germinated/lysed, debris, etc.). And, in performing the analysis, the computing device 220 is configured to compare the library of reference images (e.g., the library specific to the crop being analyzed by the fluid imaging system 200, etc.) to the captured images. For example, when a sample including corn pollen grains is inserted into the analyzer 224 of the fluid imaging system 200 for evaluation, images captured by the camera 216 of the particles of the sample flowing through the flow chamber 202 are compared to reference images included in the library associated with corn pollen grains (e.g., directly to the reference images, to rules generated based on the reference images, to classifications generated based on the reference images, etc. associated therewith; etc.). In doing so, the computing device 220 may be programmed to provide, identify, obtain, etc. specific information regarding the shapes of the particles in the captured images, dimensions of the particles in the captured images, colors of the particles in the captured images, and other specific features of the particles (e.g., whether a particle includes a tube indicating germination, a length of the tube, etc.) and compare the same to the reference images. Based thereon, in this example, the computing device 220 is configured to categorize (or identify) each of the captured images (i.e., each of the particles in the captured images) into a germinated category, at 126, a non-germinated/lysed category, at 128, and a debris category, at 130. It should be appreciated that other categories may be used, or even additional categories, in other example embodiments. For instance, in some embodiments, a multiples category may be used, where the multiples category may include images having multiple pollen grain particles therein (e.g., separated, tangled, etc.), a pollen grain connected to another particle (be it another pollen grain, debris, etc.), etc. (broadly, images with clusters of particles, etc.).

As an example of the analysis, a hierarchy of rules (or classifications or filters) may be established for each crop based on the reference images in the libraries. Specifically, the reference images in the libraries may be used to build the rules that are then used to evaluate the particles in the captured images. The rules are crop-specific, and may include a series of classifications performed by the computing device 220, in a particular order or not. Example classifications may include one or more of following (in a desired order, etc.): does the particle in the image satisfy a size threshold (e.g., a perimeter length of between about 50 μm and about 500 μm, etc.) (e.g., to distinguish between pollen grains and other debris or additives that have separated from the grains, etc.); does the particle have a particular roundness (or roundness factor) (e.g., based on an aspect ratio, circularity, etc.) (e.g., to distinguish un-germinated pollen grains from germinated pollen grains based on an average roundness of un-germinated pollen grains in the references images in the libraries, etc.); does the particle in the image include a tube or extension (e.g., to distinguish germinated pollen grains from un-germinated pollen grains based on an average tube length of germinated pollen grains in the references images in the libraries, etc.); does the particle granule (or body) have a length that satisfies a desired threshold and/or an width that satisfies a desired threshold; does the tube have a length that satisfies a desired threshold and/or a width that satisfies a desired threshold; does the particle in the image include a particular color ratio (e.g., red to blue, red to green, etc. whereby the ratio may indicate that the pollen grain has germinated and includes a tube; etc.); does the particle in the image define a particular area; does the tube have a particular transparency; does a ratio of length of the tube to a length of the granule (or body) satisfy a length ratio threshold; etc.

Categorizing (or identifying) the particle in the captured images into the germinated category, the non-germinated/lysed category, or the debris category, then, is based on the outcome for each of the classifications (either individual or weighted for each image). In some embodiments, the size threshold may instead be used as a basis to capture images in the first place, such that images are not captured at all for particles failing to satisfy the size threshold (and such that images are only captured of particles in the sample 230 satisfying the size threshold).

For instance, with reference to FIG. 3, the above rules (or classifications) may be applied to images 302-306 in the set 300 of images as follows. Regarding image 302, application of one or more of the above rules (or classifications) may result in an indication that the particle in the image 302 satisfies a particular size threshold for rice pollen grain (whereby the image is captured). Further application of the rules, then, may result in an indication that a body 308 of the particle does not satisfy a particular roundness factor for rice pollen grain, whereby the particle is categorized (or identified) as non-germinated/lysed. Regarding image 304, application of the rules (or classifications) may result in an indication that the particle satisfies the particular size threshold for rice pollen grain (whereby the image is captured). Further application of the rules, then, may result in an indication that a body 308 of the particle does not satisfy the particular roundness factor for rice pollen grain but does satisfy a requirement that the particle include a tube 310 or extension, whereby the particle is categorized (or identified) as germinated. And, regarding image 306, application of the rules (or classifications) may result in an indication that the particle satisfies the particular size threshold for rice pollen grain (whereby the image is captured). Further application of the rules, then, may result in an indication that a body 308 of the particle satisfies the particular length and width threshold for rice pollen grain and also satisfies a requirement that the particle include a tube 310 or extension satisfying a particular length and/or width threshold, whereby the particle is categorized (or identified) as germinated. Similar analysis may be performed on the other images in the set 300 to ultimately categorize (or identify) all of the images into either the germinated category, the non-germinated/lysed category, or the debris category (e.g., where particles may be categorized as debris if they fail all of the above rules or all of the above rules except for the size threshold (which may be the basis for the image being captured in the first place), etc.). In this way, such categorization takes into account characteristics (e.g., dimensions, relative spacing, proportions, etc.) of the pollen grain (or body), the germ tube (or tail), and/or the overall pollen particle (e.g., grain/body and tube/tail together, etc.).

In some implementations of the method 100, following application of such rules (or classifications), the computing device may further sort (or organize) the images within each category. For instance, the computing device 220 may be configured to organize (e.g., sort, etc.) the images based on one or more of particle dimension/diameter (e.g., area based diameter (ABD), equivalent spherical diameter (ESD), filled (or full) diameter (FD), etc.), color (e.g., average blue color, etc.), shape (e.g., circularity, circle fit, etc.), transparency, intensity, roughness, compactness, etc.

For example, with regard to dimensions of a particle in a captured image, the computing device 220 may be configured to calculate a diameter (or multiple diameters) of the particular and then use the calculated diameter(s) as a basis for sorting the images of the particles. In particular, the computing device 220 may be configured to calculate one or more of an ABD of the particle, an ESD of the particle, and/or a FD of the particle. ABD considers a binary image overlay of the particle and calculates the diameter based on a circle with an area equal to the area of the binary image. ESD calculates the diameter of the particle based on a circle generated from feret measurements of the particle (e.g., from 36 feret measurements of the particle, etc.). And, FD calculates the diameter of the particle based on an edge trace of the particle. What's more, in some embodiments, such dimensions may be used to assist in reclassifying any of the images, as appropriate, for example, based on comparison to the corresponding dimensions of particles in the reference images in one or more of the libraries (e.g., to corresponding calculated diameters of particles shown in the reference images, etc.).

Referring again to FIG. 1, finally in the method 100, the computing device 220 of the fluid imaging system 200 is configured to generate, at 132, a pollen germination score for the sample, based on the categorizations of the images (and the particles in the images). In general, the pollen germination score is representative of the male pollen quality included in the sample and is a direct measure of the percentage of germination of the sample. And, to generate the pollen germination score, the computing device 220 is configured to compare the number of captured images categorized into the germinated particle category to the total number of captured images of pollen grains (i.e., to the total number of captured images that include either germinated pollen grains or non-germinated pollen grains). The ratio thereof, then, is expressed as the pollen germination score. For example, for a sample having 1000 captured images, where 700 of the images include germinated pollen grains, 200 of the images include non-germinated/lysed pollen grains, and 100 of the images include debris, the pollen germination score may be expressed as 700/900, or 78%.

The computing device 220 may then store the pollen germination score in memory, in association with the sample, and/or transmit the pollen germination score to a user. In connection therewith, then, the user may use the pollen germination score in one or more manners. For example, the pollen germination score is useful in a variety of applications including to assess pollen quality during pollen collection, storage, and application, for breeding applications, to assess pollen quality over time, seasons, and environmental conditions, to develop planting recommendations during hybrid production, and understanding pollen quality after specific traits have been added, etc. In one example, the pollen germination score may be used to identify peak pollen viability windows for crops (e.g., times of day, days of week, weeks of year, etc.), where pollen of the crops is most viable. As can be appreciated, this may help in identifying desired times to collect such pollen, etc. In another example, the pollen germination score may be used to identify specific hybrids with peak pollen viability, etc. In still a further example, the pollen germination score may be used to identify effects of storage parameters on pollen, effects of environmental factors on pollen, etc.

In some embodiments, after the captured images are categorized, the captured images are stored in the data structure 222, for example, as additional reference images for the crop (as part of the library for the crop, etc.). Additionally, the stored images may be used (e.g., by researchers, etc.) to reevaluate pollen morphology for additional characteristics, as desired.

In addition, while the computing device 220 is illustrated as separate from the analyzer 224 of the fluid imaging system 200 in FIG. 2, it should still be considered a part of the fluid imaging system 200 (although this is not required in all embodiments of the present disclosure). What's more, in some embodiments, the computing device 220 may be integral with the analyzer 224 of the fluid imaging system 200 (e.g., such that the computing device 220 is coupled to and/or integrated within a body of the analyzer 224, etc.). Further, while the data structure 222 is illustrated as separate from the computing device 220 in FIG. 2 (and in communication therewith via one or more network, as indicted by the arrowed line and as described above), it may be an integral part thereof in other embodiments (e.g., part of a memory of the computing device 220, etc.). Additionally, or alternatively, the data structure 222 may be included in cloud storage in some example embodiments. Moreover, while only one analyzer 224 is illustrated in FIG. 2 in communication with the computing device 220, it should be appreciated that multiple such analyzers may be in communication with the computing device in other embodiments (e.g., directly, via one or more networks, via a gateway, etc.).

In the above description of the method 100, in connection with analyzing the captured images of the pollen (at 124), the computing device 220 is configured to make use of the one or more libraries of reference images of pollen grains to categorize the pollen grains included in the captured images. In doing so, the computing device 220 may use one or more machine learning models (e.g., via support vector machine, gradient boosting classifiers, etc.) to compare image features between captured images and the references in (in the image library(ies)) to make the classifications.

In other example embodiments, in connection with analyzing the captured images of the pollen (at 124), the computing device 220 may be configured to implement one or more deep neural network models (e.g., a Mask Region-based Convolutional Neural Network (MASK-CNN), a You Only Look Once (YOLO) model, etc.) to classify the images, and in particular, the particles included in the images, for example, as germinated, non-germinated/lysed, debris, multiples (e.g., where the image includes multiple particles together, etc.). etc. In doing so, particle labels may be created by individuals involved in developing the deep learning neural network model, using image labeling tools and the library of images described above (e.g., as a training data set (or training data), etc.). Both images and labels are then used to train the deep neural network(s) (e.g., taking into account the various pollen features described above, etc.). For example, the labels may be used to identify items in the images such as germinated, non-germinated/lysed, debris, or multiples (as generally described above). The trained deep neural network model(s) is/are deployed in the system 200, for example (e.g., via the computing device 220, etc.), to detect, identify, etc. pollen particles on pollen video/images based on the labels. The model(s) detects/identifies particles, segments them from background, and classifies them to the different classes, based on the teaching. Additional image analysis may also be applied to calculate geometrical and physical traits of the detected pollen particle (as also generally described above).

Figure 4:
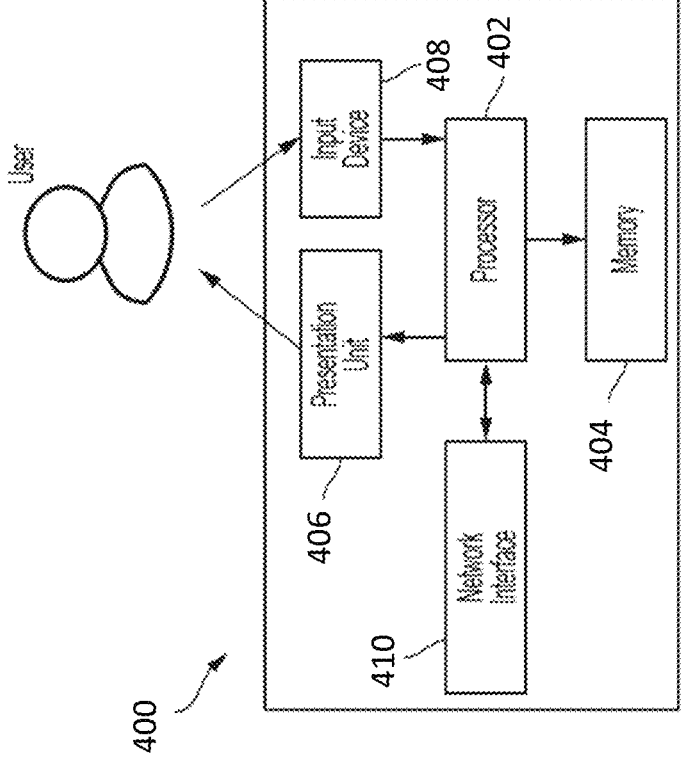
FIG. 4 illustrates an example computing device that may be used in the method of FIG. 1 and/or the system of FIG. 2.

FIG. 4 illustrates a computing device 400 that may be used with the method 100 and/or the fluid imaging system 200. The computing device 400 may include, for example, one or more servers, workstations, personal computers, laptops, tablets, smartphones, PDAs, etc. In addition, the computing device 400 may include a single computing device, or it may include multiple computing devices located in close proximity or distributed over a geographic region, so long as the computing devices are specifically configured to function as described herein. In at least one example embodiment, the computing device 220 of the fluid imaging system 200 is generally consistent with the computing device 400 (whereby the description of the computing device 400 is substantially the same as a description of the computing device 220). However, the computing device 220 should not be considered to be limited to the computing device 400, as described below, as different computing devices and/or arrangements of computing devices may be used. In addition, different components and/or arrangements of components may be used in other computing devices.

With that said, the illustrated computing device 400 (as representative of the computing device 220, for example) includes a processor 402 and a memory 404 coupled to (and in communication with) the processor 402. The processor 402 is generally configured to execute all functions of the computing device 220 to automatically control the operation of the analyzer 224 of the fluid imaging system 200 and/or analyze the output of the analyzer 224, as described herein. The processor 402 may include one or more processing units (e.g., in a multi-core configuration, etc.). For example, the processor 402 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 404, as described herein, is one or more devices that permit data, instructions, etc. to be stored therein and retrieved therefrom. The memory 404 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 404 may be configured to store, without limitation, software packages or programs, algorithms or subroutines (e.g., algorithms or subroutines to analyze output of the fluid imaging system 200 and/or control the analyzer 224 of the fluid imaging system 200 and components thereof as described herein, etc.), images (e.g., categorized libraries of reference images of pollen particles and non-pollen particles, etc.), and/or other types of data (and/or data structures) suitable for use as described herein (e.g., data structure 222, etc.). Furthermore, in various embodiments, computer-executable instructions may be stored in the memory 404 for execution by the processor 402 to cause the processor 402 to perform one or more of the functions described herein, such that the memory 404 is a physical, tangible, and non-transitory computer readable storage media. Such instructions often improve the efficiencies and/or performance of the processor 402 and/or other computer system components configured to perform one or more of the various operations herein. It should be appreciated that the memory 404 may include a variety of different memories, each implemented in one or more of the functions or processes described herein.

In the example embodiment, the computing device 400 also includes a presentation unit 406 that is coupled to (and is in communication with) the processor 402 (however, it should be appreciated that the computing device 400 could include output devices other than the presentation unit 406, etc.). The presentation unit 406 outputs information, data, and/or graphical representations (e.g., pollen germination scores, images of pollen grains, etc.), visually, for example, to a user of the computing device 400 and/or the fluid imaging system 200, etc. And, various interfaces (e.g., as defined by network-based applications, etc.) may be displayed at computing device 400, and in particular at presentation unit 406, to display such information. The presentation unit 406 may include, without limitation, a liquid crystal display (LCD), a light-emitting diode (LED) display, an organic LED (OLED) display, an "electronic ink" display, speakers, etc. In some embodiments, presentation unit 406 includes multiple devices.

In addition, the computing device 400 includes an input device 408 that receives inputs from the user (i.e., user inputs) such as, for example, sample specific values, sample selection/operation data, etc. The input device 408 may include a single input device or multiple input devices. The input device 408 is coupled to (and is in communication with) the processor 402 and may include, for example, one or more of a keyboard, a pointing device, a mouse, a stylus, a RFID reader, bar code reader, another reader, a touch sensitive panel (e.g., a touch pad or a touch screen, etc.), another computing device, and/or an audio input device. In addition, in various example embodiments, a touch screen, such as that included in a tablet, a smartphone, or similar device, behaves as both a presentation unit and an input device.

Further, the illustrated computing device 400 also includes a network interface 410 coupled to (and in communication with) the processor 402 and the memory 404. The network interface 410 may include, without limitation, a wired network adapter, a wireless network adapter (e.g., a near field communication (NFC) adapter, a Bluetooth adapter, etc.), an RFID reader, a mobile network adapter, or other device capable of communicating with one or more different networks and/or components of one or more different networks.

In one or more embodiments, the computing device 400 (e.g., the processor 402, etc.) may be communicatively connectable, via the network interface 410, to a remote server network (e.g., a local area network (LAN), etc.), via a wired or wireless link. In this manner, the computing device 400 may communicate with the remote server network to upload and/or download data, information, algorithms, software programs, and/or receive operational commands (e.g., for operation of the fluid imaging system 200 and/or the analyzer 224 thereof, etc.). In addition, in one or more embodiments, the computing device 400 may be configured to access the Internet to upload and/or download data, information, algorithms, software programs, etc., to and from Internet sites and network server.

In one or more embodiments, the computing device 400 may include one or more particle classification, germination scoring, and/or system control algorithms, programs, routines, or subroutines, or programs stored in the memory 404 and executed by the processor 402. The one or more particle classification, germination scoring, and/or system control algorithms, programs, routines, or subroutines may include instructions to manage operational speeds of the pump 208, light source 210, and detection system 214, and/or to utilize and/or apply the images of the pollen particles and non-pollen particles of a sample to score the germination of the sample, as described herein. In connection therewith, the computing device 220, as implemented in the computing device 400, executes one or more system algorithms (i.e., computer executable instructions) to control operation of the fluid imaging particle analysis system 200 and/or the analyzer 224 thereof to directly and automatically score the germination of pollen in a sample. In this way, the computing device 220 functions to generally automate the germination scoring operation described herein for the system 200.

The foregoing description of the embodiments has been provided for purposes of illustration and description. It is not intended to be exhaustive or to limit the present disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the present disclosure, and all such modifications are intended to be included within the scope of the present disclosure.

Example embodiments have been provided so that this disclosure will be thorough, and will fully convey the scope to those who are skilled in the art. Numerous specific details are set forth such as examples of specific components, assemblies, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, components, and/or groups thereof, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" and the phrase "at least one of" includes any and all combinations of one or more of the associated listed items.

Although the terms first, second, third, etc. may be used herein to describe various elements, components, seeds, members and/or sections, these elements, components, seeds, members and/or sections should not be limited by these terms. These terms may be only used to distinguish one element, component, seed, member or section from another element, component, seed, member or section. Terms such as "first," "second," and other numerical terms when used herein do not imply a sequence or order unless clearly indicated by the context. Thus, a first element, component, seed, member or section discussed below could be termed a second element, component, seed, member or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method for assessing germination of pollen grains, the method comprising:

germinating pollen grains of a crop in a germination media;

inserting a sample of the germinated pollen grains and germination media into a flow chamber of a fluid imaging system;

generating, by the fluid imaging system, a flow of the sample through the flow chamber at a predefined rate;

capturing, by an image capture device of the fluid imaging system, multiple images of the sample as the sample flows through the flow chamber;

identifying, by a processor of the fluid imaging system, the captured images of the sample into categories, wherein the categories include a germinated pollen grain category and at least one of: a non-germinated pollen grain category, a lysed pollen grain category, and/or a debris particle category; and based on the identification of the images into the categories, generating, by the processor, a pollen germination score for the sample, the pollen germination score indicative of germinated pollen grains in the sample.

2. The method of claim 1, further comprising preparing the germination media prior to germinating the pollen grains in the germination media, wherein the germination media is specific to the crop; and wherein germinating the pollen grains includes:

placing the germination media in a container;

introducing the pollen grains into the germination media, within the container; and incubating the pollen grains in the germination media, within the container, for a predetermined period of time.

3. The method of claim 1, wherein identifying the captured images of the sample into the categories includes comparing the captured images of the sample to reference images stored in a database, wherein the reference images are specific to the crop and include at least one image of a germinated pollen grain, and at least one image of: a non-germinated pollen grain, a lysed pollen grain, and/or a debris particle.

4. The method of claim 3, wherein comparing the captured images of the sample to the reference images includes categorizing each of the captured images into one of the categories based on at least one particle included in the captured image matching or substantially matching one of the reference images associated with the same one of the categories.

5. The method of claim 3, further comprising generating at least one rule based on the reference images stored in the database identifying the reference images into one of the categories; and wherein comparing the captured images of the sample to the reference images includes categorizing each of the captured images into one of the categories based on the at least one rule.

6. The method of claim 5, wherein the at least one rule relates to one or more of a size of particles included in the reference images, a roundness factor of particles included in the reference images, a shape of particles included in the reference images, and a color of particles included in the reference images.

7. The method of claim 1, wherein generating the pollen germination score includes calculating the percentage of germinated pollen grains based on the number of captured images categorized into the germinated pollen grain category and the number of captured images categorized into the non-germinated pollen grain category, lysed pollen grain category, and debris particle category.

8. The method of claim 1, further comprising:

filtering the pollen grains of the crop prior to germinating the pollen grains in the germination media; and/or filtering the sample of the germinated pollen grains and germination media prior to inserting the sample into the flow chamber of the fluid imaging system.

9. The method of claim 1, further comprising combining at least one stop agent with the pollen grains of the crop in the germination media, after germinating the pollen grains in the germination media, to thereby pause germination of the pollen grains.

10. The method of claim 1, wherein identifying the captured images of the sample into the categories includes identifying the captured images of the sample into the categories based on a deep neural network model.

11. A method for assessing germination of pollen grains of a crop, the method comprising:

germinating pollen grains of the crop in a germination media;

inserting a sample of the germinated pollen grains and germination media into a flow chamber of a fluid imaging system;

generating, by the fluid imaging system, a flow of the sample through the flow chamber;

capturing, by an imaging device of the fluid imaging system, images of the sample as the sample flows through the flow chamber based on a size threshold of particles included in the sample, whereby images are only captured of particles in the sample satisfying the size threshold;

categorizing, by a processor of the fluid imaging system, each of the captured images of the sample into one of a germinated category and a non-germinated and/or lysed category; and generating, by the processor, a pollen germination score for the sample based on the categorization of the captured images, the pollen germination score indicative of germinated pollen grains in the sample.

12. The method of claim 11, wherein germinating the pollen grains in the germination media includes germinating the pollen grains in the germination media for a predefined incubation time.

13. The method of claim 11, wherein the size threshold is between about 50 μm and about 500 μm.

14. The method of claim 11, wherein categorizing each of the captured images of the sample into one of the germinated category and the non-germinated and/or lysed category;

wherein the method further comprises generating the at least one rule based on reference images stored in a database, the reference images specific to the crop and including images of a germinated pollen grain and at least one of: a non-germinated pollen grain, a lysed pollen grain, and/or a debris particle.

15. The method of claim 11, wherein generating the pollen germination score includes calculating a percentage of germinated pollen grains in the sample based on a number of captured images categorized into the germinated category and a number of captured images categorized into the non-germinated and/or lysed category.

16. The method of claim 11, further comprising:

filtering the pollen grains of the crop prior to germinating the pollen grains in the germination media; and/or filtering the sample of the germinated pollen grains and germination media prior to inserting the sample into the flow chamber of the fluid imaging system.

17. The method of claim 11, further comprising combining at least one stop agent with the pollen grains of the crop in the germination media, after germinating the pollen grains in the germination media, to thereby pause germination of the pollen grains.

18. The method of claim 11, wherein identifying the captured images of the sample into the categories includes identifying the captured images of the sample into the categories based on a deep neural network model.

19. A system for use in assessing germination of pollen grains of a crop, the system comprising:

a germination media specific to the crop and configured to promote germination of pollen grains incubated in the germination media;

an analysis unit configured to:

receive a sample of the germinated pollen grains and germination media;

apply a size threshold to the particles in the sample; and capture images of the particles included in the sample that satisfy the size threshold; and a computing device in communication with the analysis unit, the computing device configured to:

categorize the captured images of the sample into one of a germinated pollen grain category and a non-germinated and/or lysed pollen grain category based on at least one rule; and generate a pollen germination score for the sample based on the categorization of the captured images, the pollen germination score indicative of germinated pollen grains in the sample.

20. The system of claim 19, wherein the analysis unit includes:

a chamber configured to receive the sample; and an imaging device directed at the chamber, the imaging device configured to capture the images of the particles included in the sample, in the chamber, based on the size threshold.

* * * * *